(12) United States Patent
Anderson et al.

(10) Patent No.: US 10,473,351 B2
(45) Date of Patent: Nov. 12, 2019

(54) HVAC CONTROL WITH A REMOTE USER INTERFACE AND A REMOTE TEMPERATURE SENSOR

(71) Applicant: Ademco Inc., Golden Valley, MN (US)

(72) Inventors: Peter Anderson, St. Paul, MN (US); Ryan Strassburg, Rogers, MN (US); Rolf Lee Strand, Crystal, MN (US); Luke A. Piram, Richfield, MN (US); John D. Mitchell, Maple Grove, MN (US)

(73) Assignee: Ademco Inc., Golden Balley, MN (US)

( * ) Notice: Subject to any disclaimer, the term of this patent is extended or adjusted under 35 U.S.C. 154(b) by 48 days.

(21) Appl. No.: 15/424,665

(22) Filed: Feb. 3, 2017

(65) Prior Publication Data
US 2018/0224143 A1 Aug. 9, 2018

(51) Int. Cl.
| | | |
|---|---|---|
| F24F 11/00 | (2018.01) | |
| G05B 19/048 | (2006.01) | |
| F24F 11/30 | (2018.01) | |
| F24D 19/10 | (2006.01) | |
| F24F 11/56 | (2018.01) | |
| F24F 11/58 | (2018.01) | |
| F24F 11/64 | (2018.01) | |
| F24F 110/10 | (2018.01) | |

(52) U.S. Cl.
CPC .......... *F24F 11/30* (2018.01); *F24D 19/1084* (2013.01); *F24F 11/56* (2018.01); *F24F 11/58* (2018.01); *F24F 11/64* (2018.01); *F24F 2110/10* (2018.01); *F24F 2221/18* (2013.01); *G05B 2219/2614* (2013.01)

(58) Field of Classification Search
CPC .. F24F 11/30; F24F 11/56; F24F 11/58; F24F 2110/10; F24D 19/1084; G05B 2219/2614
See application file for complete search history.

(56) References Cited

U.S. PATENT DOCUMENTS

| 4,829,779 A | 5/1989 | Munson et al. |
|---|---|---|
| 5,801,940 A | 9/1998 | Russ et al. |
| (Continued) | | |

OTHER PUBLICATIONS

Kumo cloud, Owner Operation Manual for User, 2016, Mitsubishi Electric, v 2.6, 37 pages (Year: 2016).*
(Continued)

*Primary Examiner* — Mark A Connolly
(74) *Attorney, Agent, or Firm* — Shmaker & Sieffert, P.A.

(57) ABSTRACT

An illustrative HVAC controller may include a communication module for wirelessly communicating with a network and wiring terminals for receiving a wired connection to a remote temperature sensor that is situated remote from the HVAC controller and in a living space of the building. A controller may be operably coupled to the communication module and the wiring terminals and may be configured to implement a thermostat control algorithm to generate one or more control signals, wherein the one or more control signals are provided by a wired connection to the HVAC system to control one or more HVAC components of the HVAC system. The thermostat control algorithm may be configured to compare a sensed temperature received from the remote temperature sensor via the wiring terminals and a temperature setpoint received from the server via the network.

20 Claims, 11 Drawing Sheets

(56) References Cited

U.S. PATENT DOCUMENTS

| | | | |
|---|---|---|---|
| 6,449,533 B1* | 9/2002 | Mueller | G05D 23/1904 236/91 D |
| 6,619,055 B1 | 9/2003 | Addy | |
| 6,622,925 B2 | 9/2003 | Carner et al. | |
| 7,133,748 B2 | 11/2006 | Robinson | |
| 7,574,283 B2 | 8/2009 | Wang et al. | |
| 7,992,794 B2 | 8/2011 | Leen et al. | |
| 8,740,101 B2 | 6/2014 | Leen et al. | |
| 9,080,782 B1* | 7/2015 | Sheikh | F24F 11/00 |
| 2003/0040279 A1 | 2/2003 | Ballweg | |
| 2006/0112700 A1 | 6/2006 | Choi et al. | |
| 2007/0119961 A1 | 5/2007 | Kaiser | |
| 2007/0182594 A1 | 8/2007 | Face et al. | |
| 2007/0241203 A1 | 10/2007 | Wagner et al. | |
| 2007/0290924 A1 | 12/2007 | McCoy | |
| 2012/0136964 A1* | 5/2012 | Iggulden | G05B 15/02 709/217 |
| 2012/0233478 A1* | 9/2012 | Mucignat | H04W 4/80 713/320 |
| 2013/0213952 A1 | 8/2013 | Boutin et al. | |
| 2014/0135998 A1 | 5/2014 | Cao et al. | |
| 2014/0188287 A1 | 7/2014 | Sabata | |
| 2014/0217186 A1 | 8/2014 | Kramer et al. | |
| 2015/0195099 A1* | 7/2015 | Imes | G05B 15/02 700/275 |

OTHER PUBLICATIONS

Kumo cloud, Owner Operation Manual/Install Guide for Installer, 2016, Mitsubishi Electric, v 2.0, 24 pages (Year: 2016).*
Hadley, Hacking a Mitsubishi Heat Pump/Air Conditioner, Oct. 11, 2016, https://nicegear.nz/blog/hacking-a-mitsubishi-heat-pump-air-conditioner , pp. 1-6 (Year: 2016).*
Honeywell, "RedLink Zoning Options, With IAQ Control From Zone 1 Stat," 6 pages, Jan. 2014.
Honeywell, "Connected Solutions, Comfort Made Simple," 2 pages, 2016.
Honeywell, "Equipment Interface Module," Installation Guide, 48 pages, Nov. 2012.
Honeywell, "ERM5220R Equipment Remote Module with RedLink Wireless Technology," Install Guide, 60 pages, Nov. 2015.
Honeywell "Equipment Interface Module, Installation Guide," Nov. 2012, 48 pp.
Honeywell Home, "Connected Solutions. Comfort made simple," accessed from forwardthinking.honeywell.com, 2016, 2 pp. (Applicant points out, in accordance with MPEP 609.04(a), that the year of publication, 2016, is sufficiently earlier than the effective U.S. filing date, so that the particular month of publication is not in issue.).
Honeywell, "RedLINK Zoning Options," Jan. 2014, 6 pp.
Honeywell, "ERM522OR Equipment Remote Module with Redlink Wireless Technology," Nov. 2015, 60 pp.

* cited by examiner

HVAC CONTROL WITH A REMOTE USER INTERFACE AND A REMOTE TEMPERATURE SENSOR The present disclosure relates to Heating, Ventilation, and/or Air Conditioning (HVAC) systems, and more particularly to control of such HVAC systems.

BACKGROUND

Heating, Ventilation, and/or Air Conditioning (HVAC) systems are often used to control the comfort level within a building or other structure. Such HVAC systems typically include an HVAC controller that controls various HVAC components of the HVAC system in order to affect and/or control one or more environmental conditions within the building. In many cases, the HVAC controller is mounted within the building and provides control signals to various HVAC components of the HVAC system. Improvements in the hardware, user experience, and functionality of such HVAC controllers would be desirable.

SUMMARY

This disclosure relates generally to Heating, Ventilation, and/or Air Conditioning (HVAC) systems, and more particularly to control of such HVAC systems. In a particular example, an HVAC controller for an HVAC system includes a communication module for wirelessly communicating with a network and for establishing communicating with a remote server via the network. The illustrative HVAC controller includes wiring terminals for receiving a wired connection to a remote temperature sensor that is situated remote from the HVAC controller and in the living space of the building. A controller is operably coupled to the communication module and the wiring terminals and is configured to implement a thermostat control algorithm to generate one or more control signals. In this example, the one or more control signals are provided by a wired connection to the HVAC system to control one or more HVAC components of the HVAC system. The thermostat control algorithm may be configured to compare a sensed temperature received from the remote temperature sensor via the wiring terminals and a temperature setpoint received from the server via the network.

Another example includes an HVAC controller for an HVAC system. In this example, the HVAC controller may include a communication module establishing communicating with a remote server via a network, and also to wirelessly communicate with a remote temperature sensor that is situated remote from the HVAC controller and in the living space of the building. A controller is operably coupled to the communication module and is configured to implement a thermostat control algorithm to generate one or more control signals, wherein the one or more control signals are provided by a wired connection to the HVAC system to control one or more HVAC components of the HVAC system. The thermostat control algorithm may be configured to use a sensed temperature received from the remote temperature sensor via the communication module and a temperature setpoint received from the server via the network.

Another example includes an HVAC controller for an HVAC system. In this example, the HVAC controller includes wiring terminals for receiving a wired connection to a wireless module that is distinct from the HVAC controller. The wireless module may be configured to communicate with a remote server via a network. The wiring terminals are also for receiving a wired connection to a remote temperature sensor that is situated remote from the HVAC controller and in the living space of the building. A controller may be operably coupled to the wiring terminals and may be configured to implement a thermostat control algorithm to generate one or more control signals, wherein the one or more control signals are provided by a wired connection to the HVAC system to control one or more HVAC components of the HVAC system. The thermostat control algorithm may be configured to use a sensed temperature received from the remote temperature sensor via the wiring terminals and a temperature setpoint received from the remote server via the wiring terminals by way of the wireless module.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 1:
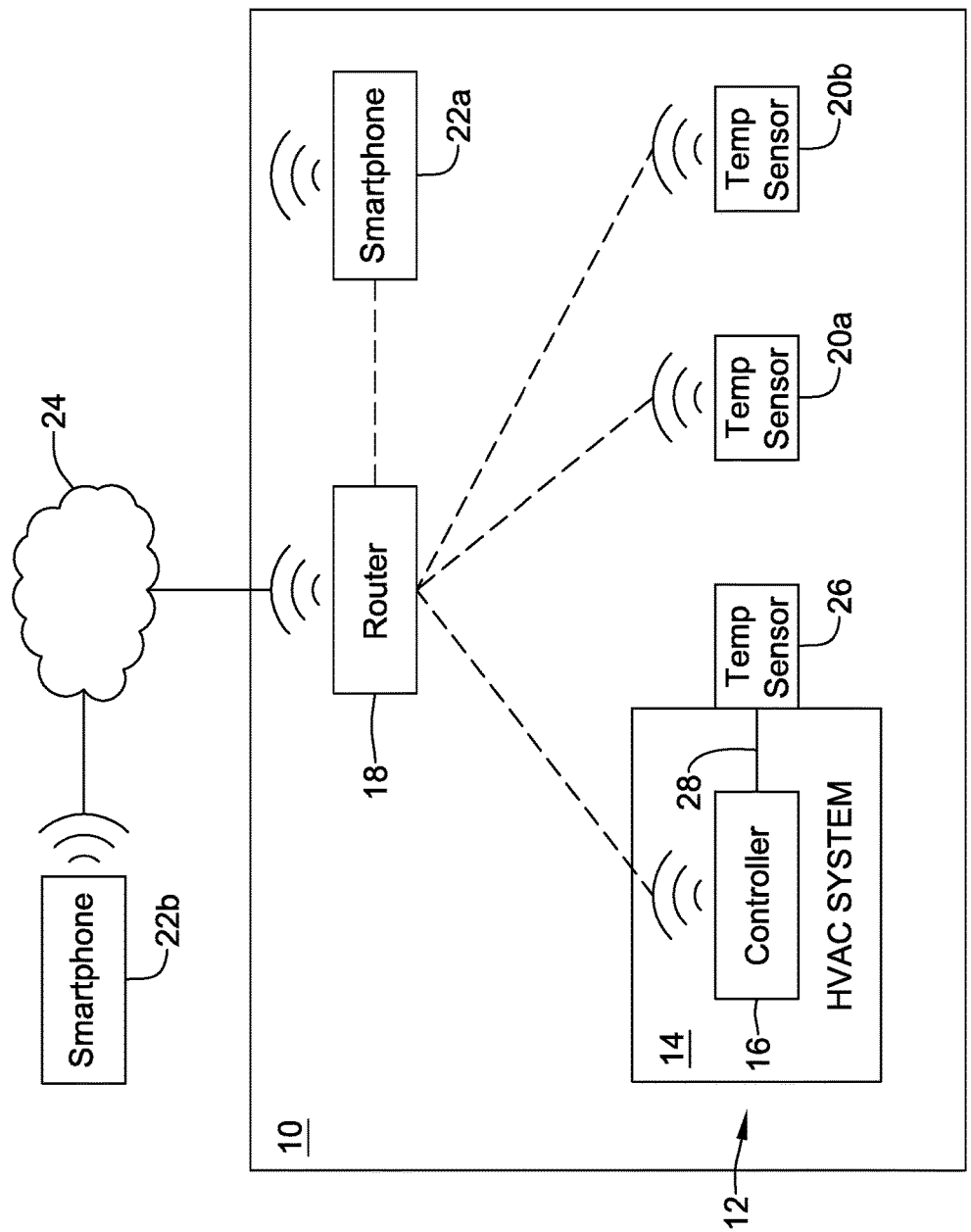
FIG. 1 is a schematic view of an illustrative HVAC system servicing a building or other structure.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

FIG. 1 is a schematic view of a building 10 having an illustrative Heating, Ventilation, and/or Air Conditioning (HVAC) system 12. While in some cases the HVAC system 12 may be a forced air furnace 14, it will be appreciated that other types of HVAC systems are contemplated including, but not limited to, boiler systems, radiant heating systems, electric heating systems, cooling systems, heat pump systems, and/or any other suitable type of HVAC system, as desired. The illustrative HVAC system 12 of FIG. 1 may include additional components, including but not limited to ductwork and air vents. Examples of additional components may also include one or more of a heat pump, an electric heat pump, a geothermal heat pump, an electric heating unit, an air conditioning unit, a humidifier, a dehumidifier, an air exchanger, an air cleaner, a damper, a valve, and/or the like.

The illustrative furnace 14 includes an HVAC controller 16 that may be configured to operate the furnace 14 (or other manifestations of the HVAC system 12). In some cases, the HVAC controller 16 may be integrated into a furnace control board of the furnace 14. The HVAC controller 16 may communicate wirelessly with, for example, a router 18 that is positioned somewhere within or around the building 10. The HVAC controller 16 may communicate with the router 18 using any suitable wireless communication protocols including, but not limited to, Wi-Fi, IrDA, IEEE 802.15.4, ZigBee, Bluetooth, dedicated short range communication (DSRC), EnOcean, and GSM or LTE cellular communication and/or any other standard or proprietary wireless protocol, as desired.

In some cases, the functions of a traditional thermostat may be divided out into distinct components. In some cases, for example, the building 10 may include one or more temperature sensors 20a-20b that may be placed about the living space of the building 10 and may communicate wirelessly with the router 18, and then with the remotely located HVAC controller 16. In some cases, one or more temperature sensors 20a-20b may be operatively connected the HVAC controller 16 via a wired connection. In some cases, there may only be a single temperature sensor within the building 10. In some cases, there may be two, three, four or more distinct temperature sensors within the building 10, each sensing local temperatures and communicating the same to the HVAC controller 16. When so provided, it is contemplated that the temperature sensors 20a, 20b may communicate with the router 18 via any wireless communication protocols including, but not limited to, Wi-Fi, IrDA, IEEE 802.15.4, ZigBee, Bluetooth, dedicated short range communication (DSRC), EnOcean, and GSM or LTE cellular communication and/or any other suitable standard or proprietary wireless protocol, as desired. In some cases, the temperature sensors 20a, 20b may communicate directly with the HVAC controller 16 without a need for the router 18 via any suitable wireless communication protocol including, but not limited to, Wi-Fi, IrDA, IEEE 802.15.4, ZigBee, Bluetooth, dedicated short range communication (DSRC), EnOcean, and GSM or LTE cellular communication and/or any other suitable standard or proprietary wireless protocol, as desired. In some cases, one or more of the temperature sensors 20a, 20b may communicate directly with the HVAC controller 16 via a wired connection (e.g. wires within the walls of the building).

In some cases, a smartphone may be used to provide a user interface for the HVAC controller 16. As illustrated, there is a first smartphone 22a shown within the building 10, communicating wirelessly with the router 18, as well as a second smartphone 22b, which is remote from the building 10 and which communicates via a cellular and/or data network 24. It will be appreciated that there is no requirement for two smartphones. Rather, this is intended to indicate that a user may utilize a user interface displayable on their smartphone regardless of whether the user is inside the building 10, as represented by the first smartphone 22a, or remote from the building 10, as represented by the second smartphone 22b. A person at home within the building 10 may use their smartphone 22a to raise or lower a temperature setpoint, for example. A person at work, away from the building 10, may use their smartphone 22b to change a temperature setpoint to an away temperature setpoint, or to turn equipment on or off, for example. In some cases, the first smartphone 22a may communicate directly with the HVAC controller 16 (e.g. not through an intervening router 18) via any suitable wireless communication protocol including, but not limited to, Wi-Fi, IrDA, IEEE 802.15.4, ZigBee, Bluetooth, dedicated short range communication (DSRC), EnOcean, and GSM or LTE cellular communication and/or any other suitable standard or proprietary wireless protocol, as desired. In some cases, the second smartphone 22b may communicate with the HVAC controller 16 through a cellular and/or other network 24 and the router 18.

It is contemplated that the HVAC controller 16 may be configured to control the comfort level in the living space of the building or other structure 10 by activating and deactivating the HVAC system 12 in a controlled manner. The HVAC controller 16 may implement a thermostat control algorithm to generate one or more control signals, wherein the one or more control signals are provided by a wired connection 86 to the HVAC system 12 to control one or more HVAC components of the HVAC system 12. In some cases, the HVAC controller 16 may include a schedule of time periods and temperature setpoints to be used for each time period. In some instances, this scheduling information may be received, entered and/or changed using a smartphone such as the first smartphone 22a or the second smartphone 22b. In some cases, a current setpoint can be changed using a smartphone such as the first smartphone 22a or the second smartphone 22b.

In some cases, the HVAC system 12 may include a temperature sensor 26 that can be located near the HVAC system 12. In some instances, the HVAC controller 16 is located in a utility room of the building in or near the HVAC system 12, and the temperature sensor 26 may be located in a nearby return air duct of the HVAC system 12 in order to provide an indication of a current air temperature within the living space of the building 10. In some instances, in order to provide temperature information to the HVAC controller 16 in the event that communication is lost between the HVAC controller 16 and the temperature sensors 20a, 20b, the temperature sensor 26 may be connected to the HVAC controller 16 via a reliable wired connection 28.

While FIG. 1 generally indicates a first smartphone 22a and a second smartphone 22b, it will be appreciated that remote access and/or control of the HVAC controller 16 may be provided via a variety of remote wireless devices including, but not limited to, mobile phones including smart phones, tablet computers, laptop or personal computers, smart watches, wireless network-enabled key fobs, e-readers, and/or the like.

In some cases, an application program code (i.e. app) stored in the memory of the first smartphone 22a and/or the second smartphone 22b may be used to remotely access and/or control the HVAC controller 16. The application program code (app) may be downloaded from an external web service, such as a web service hosted by an external web server (e.g. Honeywell's TOTAL CONNECT™ web service) or another external web service (e.g. ITUNES® or Google Play). In some cases, the app may provide a remote user interface for interacting with the HVAC controller 16 at the first smartphone 22a and/or the second smartphone 22b. For example, through the user interface provided by the app, a user may be able to change operating parameter settings such as, for example, temperature set points for one or more areas of the building, humidity set points, start times, end times, schedules, window frost protection settings, accept software updates and/or the like. These are just examples.

Figure 2:
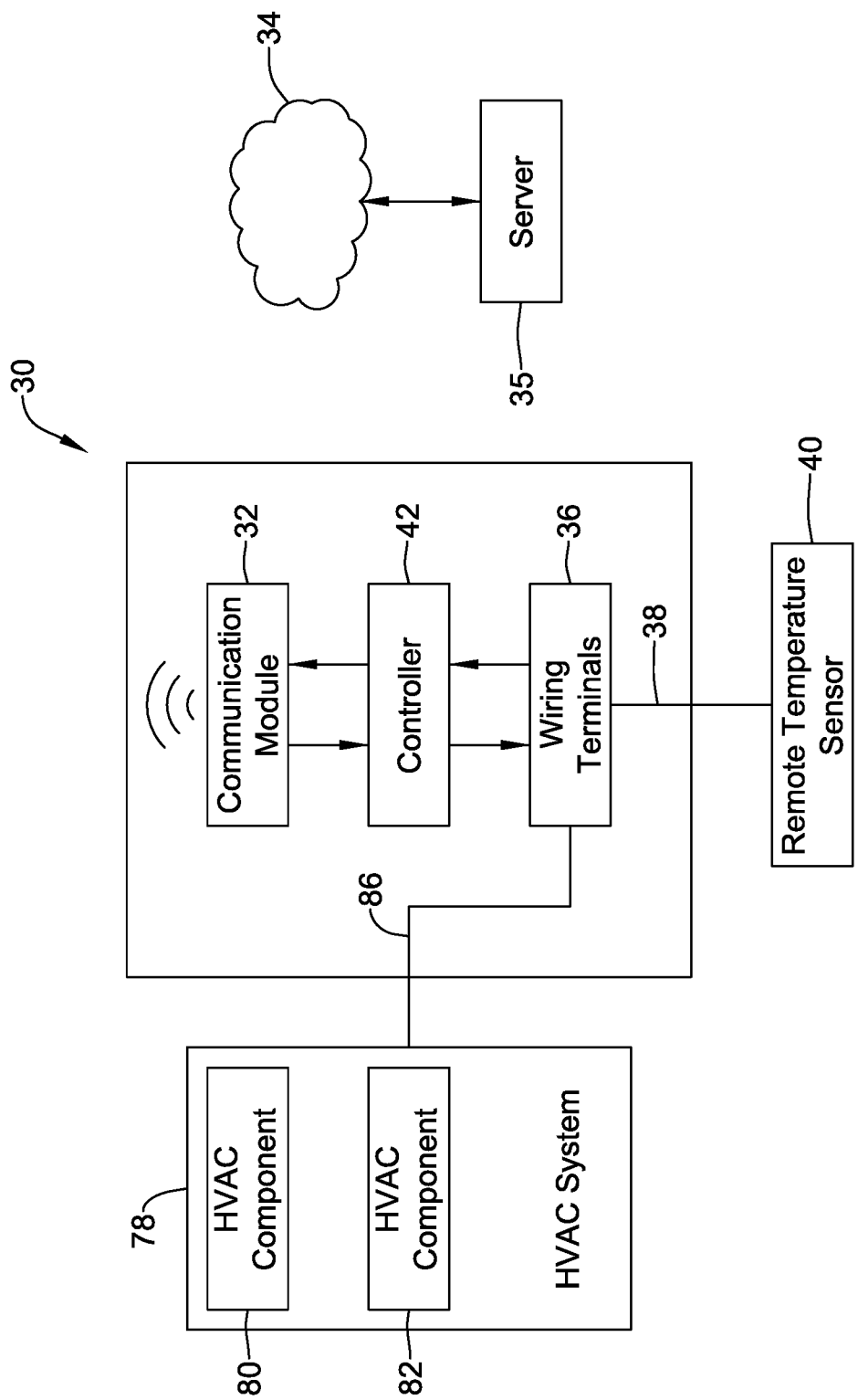
FIG. 2 is a schematic block diagram of an illustrative HVAC controller useable with the HVAC system of FIG. 1.

FIG. 2 is a schematic block diagram of an HVAC controller 30 that may be considered as being an illustrative but non-limiting example of the HVAC controller 16 (FIG. 1). The HVAC controller 30 is for controlling an HVAC system 78 that is configured to condition a living space within a building (such as the building 10 of FIG. 1) via one or more HVAC components 80, 82. The illustrative HVAC controller 30 includes a communication module 32 for wirelessly communicating with a network 34 such as a cellular or data network 24 shown in FIG. 1 or perhaps a home's wireless network (e.g. a Wifi network). The communication module 32 is configured to establish communication with a remote server 35 via the network 34, sometimes through a local router or gateway. In some cases, the communication module 32 may include a WiFi transceiver for communicating with the network 34 via a local router or gateway.

Wiring terminals 36 of the HVAC controller 30 may receive a wired connection 38 to a remote temperature sensor 40 that is situated remote from the HVAC controller 30 and in the living space of the building. In some cases, the HVAC controller 30 is located in a utility room of the building in or near the HVAC system 78. A controller 42 may be operably coupled to the communication module 32 and the wiring terminals 36, and may be configured to implement a thermostat control algorithm to generate one or more control signals. The one or more control signals may be provided to the HVAC system 78 by a wired connection 86 and may control one or more HVAC components 80, 82 of the HVAC system 78. In some cases, the thermostat control algorithm is configured to compare a sensed temperature received from the remote temperature sensor 40 via the wiring terminals 36 of the HVAC controller 30 and a temperature setpoint received from the server 35 via the network 34.

In some cases, the HVAC controller 30 may not include any on-board temperature sensor that could be used by the thermostat control algorithm in generating the one or more control signals. In some cases, the HVAC controller 30 may be implemented at least in part by a control board of one of the one or more HVAC components of the HVAC system (e.g. a furnace control board). In some cases, the HVAC controller 30 may be implemented at least in part by an Equipment Interface Module (EIM) that is wired to one or more HVAC components 80, 82 of the HVAC system 78. The EIM may be mounted near but outside of the HVAC system 78 and may provide control signals via control wires to one or more HVAC components 80, 82 of the HVAC system 78. In some cases, the HVAC controller 30 may be powered by a transformer of the HVAC system 78. In some cases, the one or more HVAC components 80, 82 of the HVAC system may include a furnace, and the HVAC controller 30 may be implemented at least in part by a furnace control board of the furnace. In some cases, a furnace may include a furnace housing, and the furnace control board may be located inside of the furnace housing.

Figure 3:
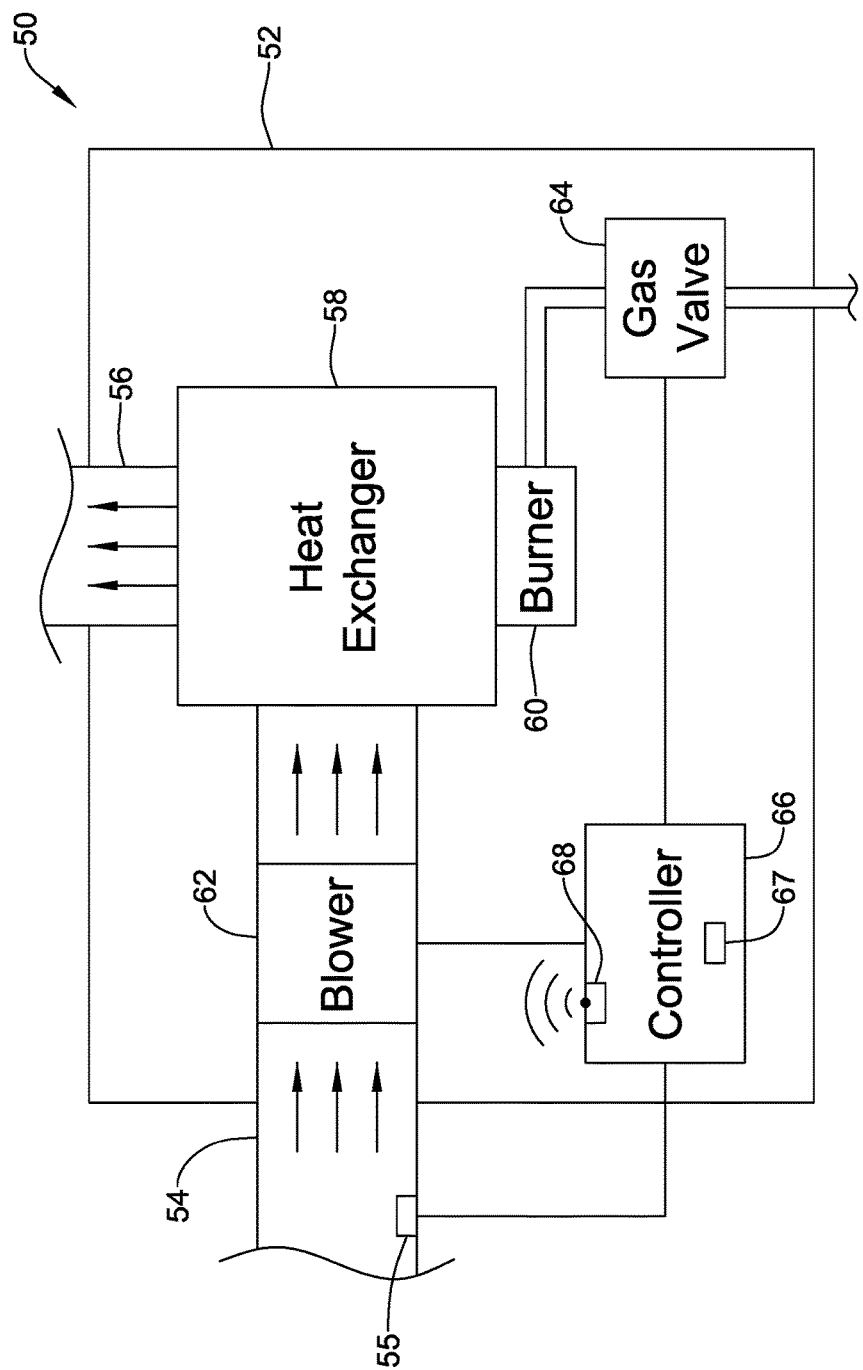
FIG. 3 is a schematic block diagram of an illustrative forced air furnace that may form part of the HVAC system of FIG. 1.

FIG. 3 provides a schematic block diagram of a forced air furnace 50 that may be considered as being an example of the HVAC system 12 shown in FIG. 1. The illustrative forced air furnace 50 includes a housing 52. A return air duct 54 enters the housing 52 and a supply air duct 56 exits the housing 52. The forced air furnace 50 may include a burner 60 that is situated within the housing 52. A heat exchanger 58 is situated within the housing 52 and is thermally coupled to the burner 60. In some cases, the heat exchanger 58 provides a thermal connection between the heated exhaust gases from the burner 60 and the air traveling through the furnace 50 from the return air duct 54 to the supply air duct 56. In some cases, the heated exhaust gases travel through the heat exchanger 58 on their way to an exhaust (not illustrated), thereby heating the surfaces of the heat exchanger 58. The air passing from the return air duct 54 to the supply air duct 56 travels over the heated surfaces of the heat exchanger 58 and thus the air is heated prior to exiting the forced air furnace 50 via the supply air duct 56. A blower 62 facilitates air movement across the heat exchanger 58 and through the forced air furnace 50.

In the example shown, a gas valve 64 provides a source of gas such as natural gas, propane or the like from a centralized gas source to the burner 60. The burner 60 burns the gas provided by the gas valve 64 to provide heat. In some cases, an HVAC controller 66 may be situated within the HVAC housing 52 and may be operatively coupled to the gas valve 64 and the blower 62. In some cases, the HVAC controller 66 may include a furnace control board 67. The HVAC controller 66 may include a communication port 68 that may be configured to receive, such as wirelessly receive, a temperature value from a remote wireless sensor or a remote wired sensor. In some cases, the communication port 68 may include wiring terminals for receiving a wired connection to a remote sensor. In some cases, the communication port 68 may be configured to wirelessly communicate with a mobile wireless device that may provide a user interface for interacting with the HVAC controller 66. In some cases, the communication port 68 may include an antenna (not shown) for supporting wireless communication. In some cases, the antenna may extend outside of the housing 52, especially when the housing includes metal.

In some cases, the HVAC controller 66 may be configured to control the gas valve 64 and the blower 62 based at least in part on the received temperature value and on a stored temperature setpoint. In some cases, the HVAC controller 66 may implement a thermostat control algorithm to control the gas valve 64 and the blower 62 in an attempt to keep the received temperature value within a predetermined dead band of the stored temperature setpoint. The predetermined dead band may be an installer-specified parameter, a factory-specified parameter or in some cases may be a user-specified parameter. In some cases, the HVAC controller 66 may be configured to control the gas valve 64 and the blower 62 based at least in part on the received temperature value unless the received temperature sensor value is currently unavailable (e.g. wireless communication link is down, etc.). If the received temperature sensor value is unavailable, the HVAC controller 66 may be configured to automatically control the gas valve 64 and the blower 62 based at least in part on a temperature value received from a return air temperature sensor, such as the return air sensor 55 (FIG. 3). In some cases, the HVAC controller 66 may be distinct from a furnace control board 67. In some cases, the HVAC controller 66 may represent the furnace control board or may be manifested on the furnace control board 67.

Figure 4:
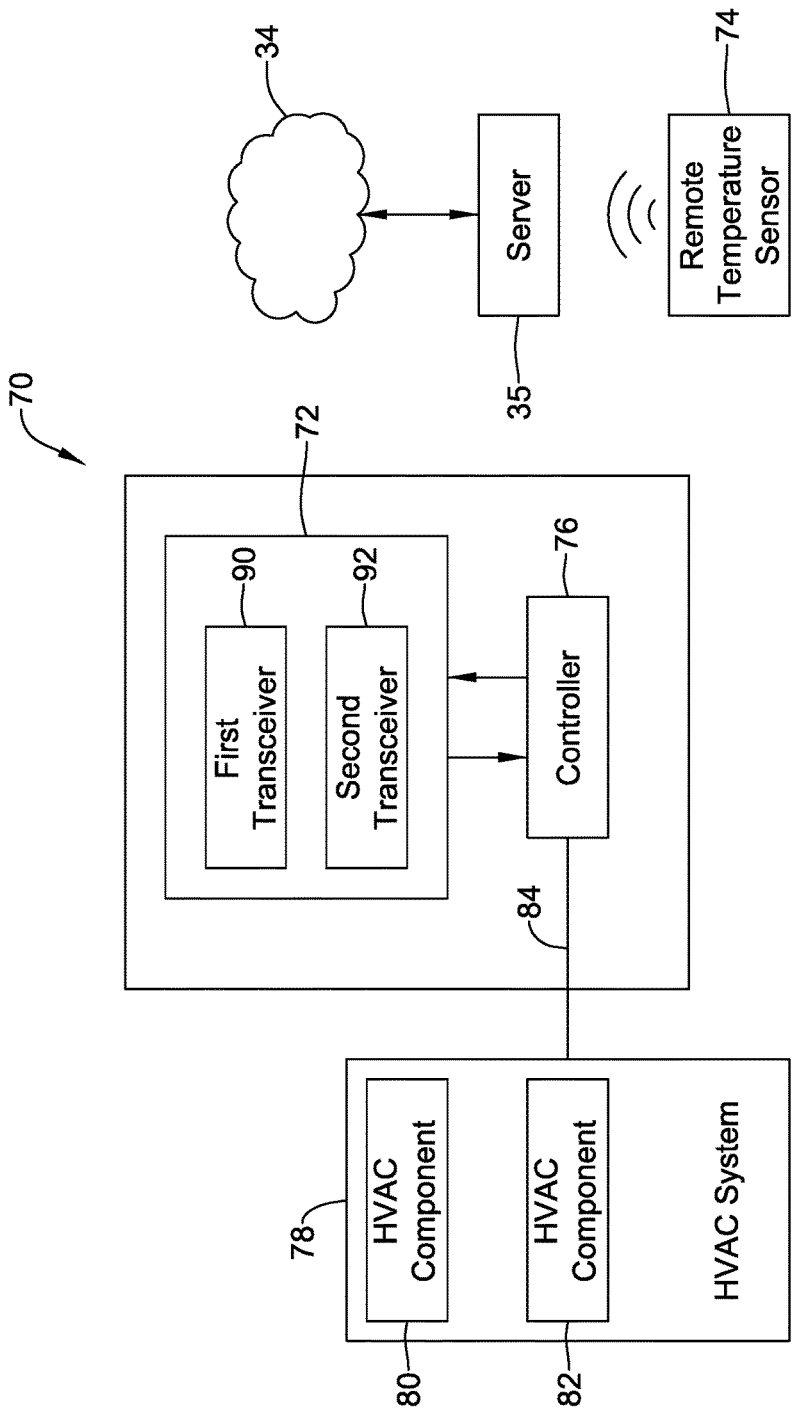
FIG. 4 is a schematic block diagram of an illustrative HVAC controller useable with the HVAC system of FIG. 1.

FIG. 4 is a schematic block diagram of an HVAC controller 70 that may be considered as being an illustrative but non-limiting example of the HVAC controller 16 (FIG. 1). The controller 70 is for an HVAC system that is configured to condition a living space within a building (such as the building 10 of FIG. 1) and includes a communication module 72 for wirelessly communicating with a remote server 35 via the network 34. The communication module 72 may be configured to wirelessly communicate with a remote temperature sensor 74 that is situated remote from the HVAC controller 70 and within the living space of the building 10. In some cases, the communication module 72 may include a first transceiver 90 for communicating with the network 34 using a first communication protocol and a second transceiver 92 for communicating with the remote temperature sensor 74 using a second communication protocol. In some instances, the second transceiver 92 may consume less power than the first transceiver 90 during wireless communication. In some cases, the first communication protocol may be Wifi, and the second communication protocol may be low energy Bluetooth, IrDA or any other suitable standard or proprietary wireless protocol. Alternatively, or in addition, the second communication protocol may include a controllable refresh rate, such that the temperature sensed by the remote temperature sensor 74 may only be transmitted at a predetermined interval or upon a predetermined change in the sensed temperature. This may be particularly useful when the remote temperature sensor 74 is powered by a battery or the like.

A controller 76 may be operably coupled to the communication module 72 and may be configured to implement a thermostat control algorithm to generate one or more control signals. The one or more control signals may be provided to the HVAC system 78 by a wired connection 84 to control one or more HVAC components 80, 82 of the HVAC system 78. In some cases, the thermostat control algorithm may be configured to use a sensed temperature received from the remote temperature sensor 74 via the communication module 72 and a temperature setpoint received from the server 35 via the network 34.

In some cases, the HVAC controller 70 may not include any on-board temperature sensor that could be used by the thermostat control algorithm in generating the one or more control signals. In some cases, the HVAC controller 70 may be implemented at least in part by a control board of one of the one or more HVAC components 80, 82 of the HVAC system 78. In some instances, one of the one or more HVAC components may include a furnace (such as the furnace 50 shown in FIG. 3), and the HVAC controller 70 may be implemented at least in part by a furnace control board 67 of the furnace 50. In some cases, the furnace control board 67 may be located inside of the furnace housing 52.

Figure 5:
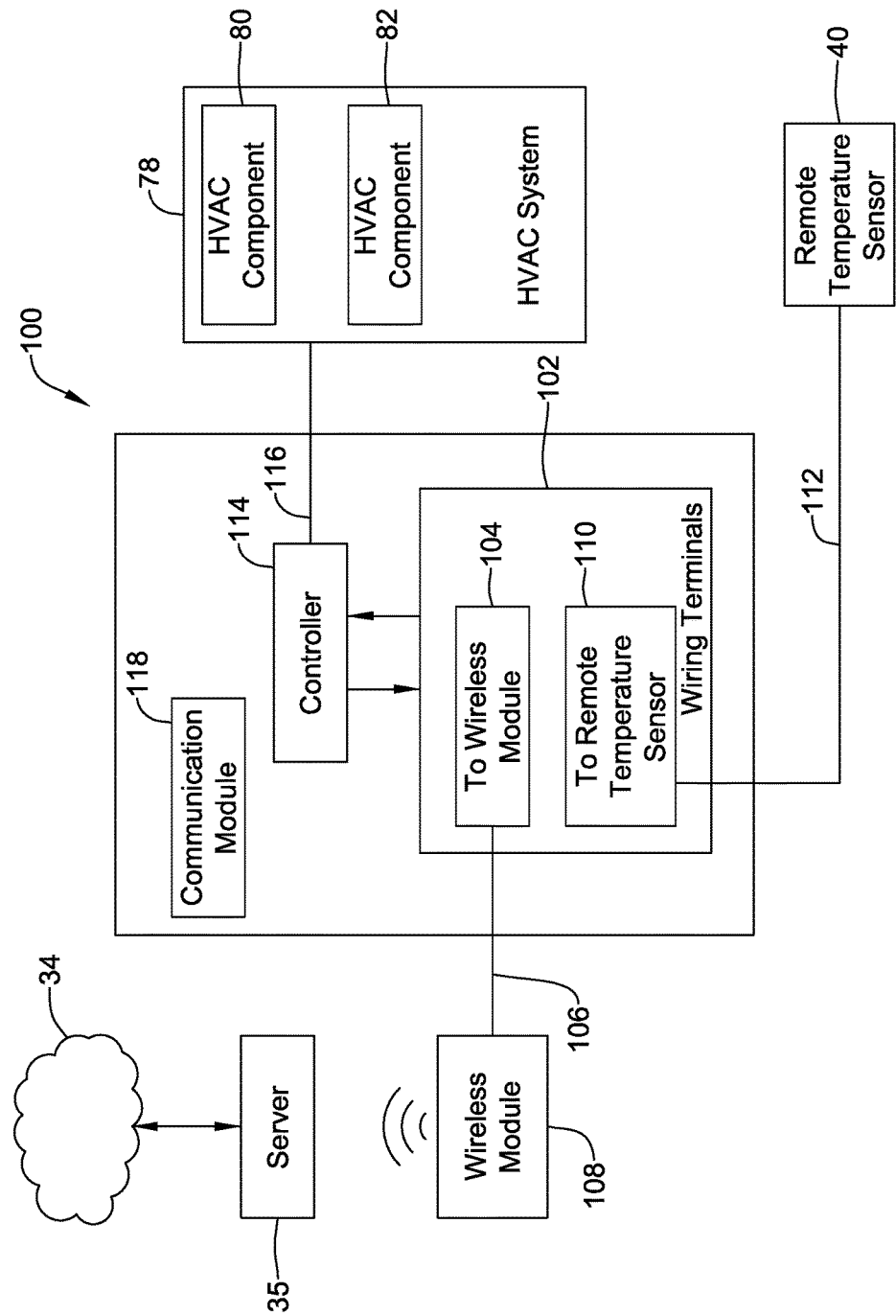
FIG. 5 is a schematic block diagram of an illustrative HVAC controller useable with the HVAC system of FIG. 1.

FIG. 5 is a schematic block diagram of an HVAC controller 100 that may be considered as being an illustrative but non-limiting example of the controller 16 (FIG. 1). The controller 100 is for an HVAC system 78 that is configured to condition a living space within a building (such as the building 10 of FIG. 1) and includes a wiring terminal block 102. In some cases, the wiring terminal block 102 may include wiring terminals 104 for receiving a wired connection 106 to a wireless module 108 that is distinct from the HVAC controller 100 as well as wiring terminals 110 for receiving a wired connection 112 to a remote temperature sensor 40 that is situated remote from the HVAC controller 100 and in the living space of the building 10. In some cases, the wireless module 108 may be configured to communicate with the remote 35 server via the network 34.

A controller 114 may be operably coupled to the wiring terminal block 102 and may be configured to implement a thermostat control algorithm to generate one or more control signals, wherein the one or more control signals are provided by a wired connection 116 to the HVAC system 78 to control one or more HVAC components 80, 82 of the HVAC system 78. The thermostat control algorithm may be configured to use a sensed temperature received from the remote temperature sensor 40 via the wiring terminals 110 and a temperature setpoint received from the remote server 35 via the wiring terminals 104 by way of the wireless module. 108. In some cases, the HVAC controller 100 can only access the network 34 via the wiring terminal block 102 by way of the wireless module 108. In some cases, the HVAC controller 100 may also include a communication module 118 for wirelessly communicating with the network 34, and the HVAC controller 100 can access the network 34 via the communication module 118 and via the wiring terminal block 102 by way of the wireless module 108.

Figure 6:
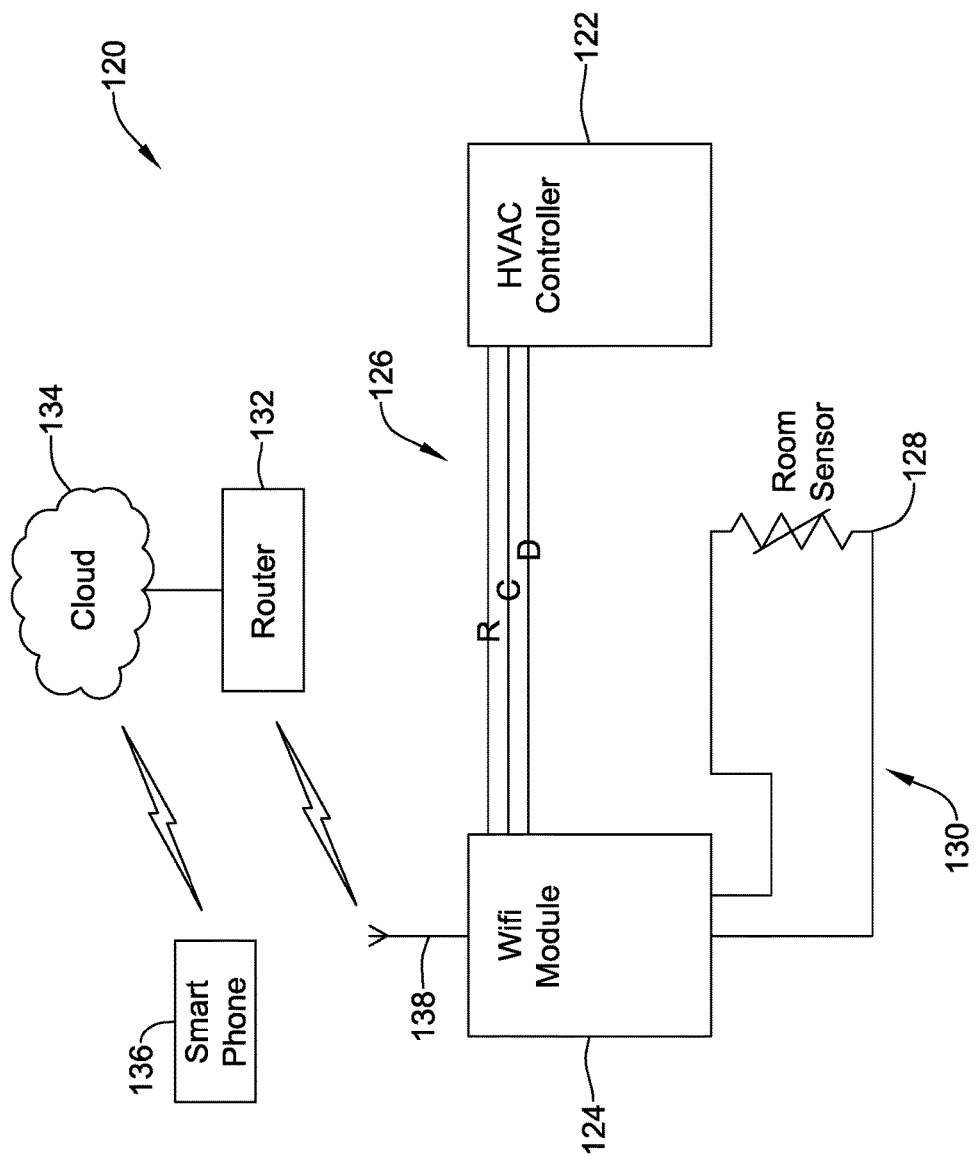
FIG. 6 is a schematic view of an illustrative HVAC control system.

FIGS. 6 through 11 provide other example HVAC control systems. FIG. 6 is a schematic block diagram of an HVAC control system 120 that may, for example, be used in controlling operation of the HVAC system 78 (FIGS. 2, 4 and 5). The HVAC control system 120 includes an HVAC controller 122 that is operably coupled to a WiFi module 124 via a wired connection 126. In some cases, as illustrated, the WiFi module 124 may include a wireless antenna 138. In some cases, as illustrated, the wired connection 126 may include at least two power lines, such as an R line and a C line, as well as a data line D. The data line D may be used to transfer data between the WiFi module 124 and the HVAC controller 122. A room temperature sensor 128 may be disposed elsewhere in the building in order to provide an indication of temperature within the living space, for example, and in the example shown may be hard wired to the WiFi module 124 via a wired connection 130. The WiFi module 124 may communicate the room temperature sensed by the temperature sensor 128 to the HVAC controller 122 across the data line D. In some cases, more than one data line may be provided, as desired.

A user is able to communicate with the WiFi module 124, and thus communicate with the HVAC controller 122, via a router 132 and cloud 134. The user may use a smartphone 136 to communicate with the cloud 134, and via the cloud 134 through the router 132 to the WiFi module 124. The WiFi module 124 may then communication with the HVAC controller 122. In some cases, the smartphone 136 may include an executable program that causes the smartphone 136 to provide a user interface that enables the user to increase or decrease a temperature setpoint, enter or edit parameters for a programmable schedule, enter or edit geofencing parameters, and the like. In some cases, the HVAC controller 122 may not include a user interface, or in some cases may only include a rudimentary user interface that permits simple edits only such as only changing the current temperature setpoint. In some cases, the WiFi module 124 may not include a user interface either.

Figure 7:
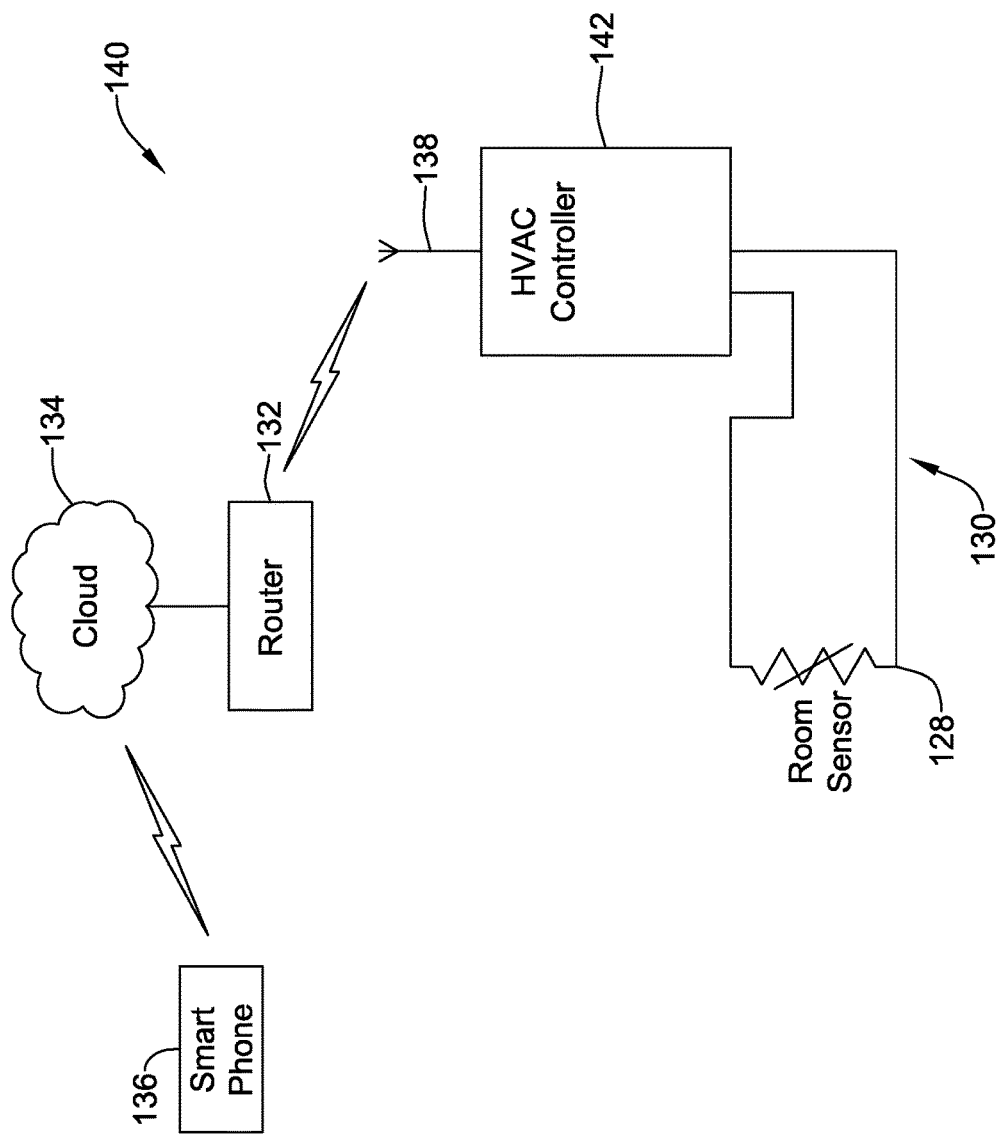
FIG. 7 is a schematic view of an illustrative HVAC control system.

FIG. 7 is a schematic block diagram of an HVAC control system 140 that may, for example, be used in controlling operation of the HVAC system 78 (FIGS. 2, 4 and 5). The illustrative HVAC control system 140 includes an HVAC controller 142 that itself includes a wireless module with a wireless antenna 138 for wireless communication. A room temperature sensor 128 may be disposed elsewhere in the building in order to provide an indication of temperature within the living space, for example, and may be hard wired to the HVAC controller 142 via a wired connection 130.

A user is able to communicate with the HVAC controller 142, via the router 132 and cloud 134. The user may use the smartphone 136 to communicate with the cloud 134, and via the cloud 134 through the router 132 to the HVAC controller 142. In some cases, the smartphone 136 may include an executable program that causes the smartphone 136 to provide a user interface that enables the user to increase or decrease a temperature setpoint, enter or edit parameters for a programmable schedule, enter or edit geofencing parameters, and the like. In some cases, the HVAC controller 142 may not include a user interface, or in some cases may only include a rudimentary user interface that permits simple edits only such as only changing the current temperature setpoint.

Figure 8:
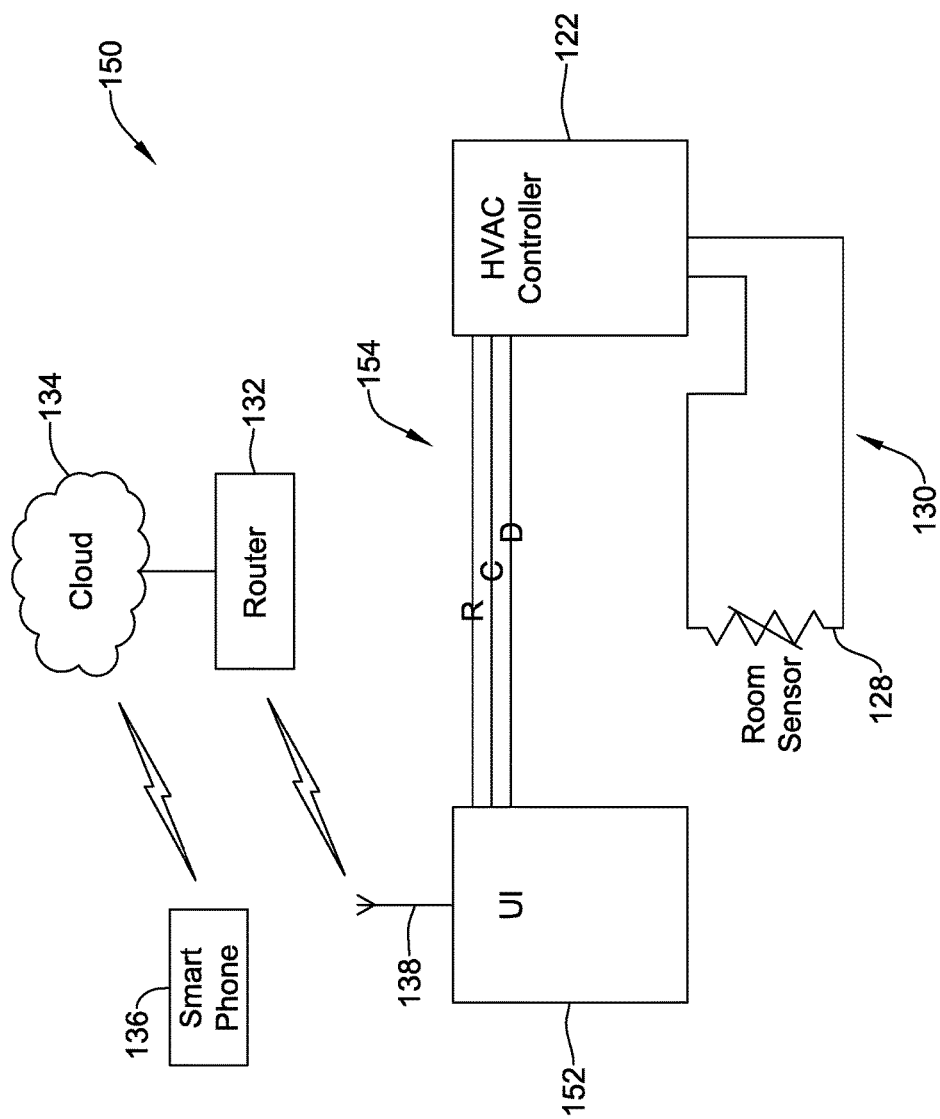
FIG. 8 is a schematic view of an illustrative HVAC control system.

FIG. 8 is a schematic block diagram of an HVAC control system 150 that may, for example, be used in controlling operation of the HVAC system 78 (FIGS. 2, 4 and 5). The illustrative HVAC control system 150 includes the HVAC controller 122 that is operably coupled to a user interface module 152 via a wired connection 154. In some cases, the wired connection 154 may include at least two power lines, such as an R line and a C line, as well as a data line D. The data line D may be used to transfer data between the user interface module 152 and the HVAC controller 122. In some cases, more than one data line may be provided, as desired. The user interface 152 includes the wireless module with an antenna 138 for wireless communication with a router 132.

In some cases, the user interface 152 may be located in the living space of the building and may provide a full function user interface for programming the HVAC controller 122. For example, the user interface 152 may allow a user to enter, edit and view various parameters of the HVAC controller 122 such as a programmable schedule, set points, geofencing parameters and the like. In some cases, the user interface 152 may only allow a user to enter, edit and/or view a limited set of parameters, such the current temperature setpoint. When so provided, the smart phone 136 may be used to enter, edit and/or view all of the parameters of the HVAC controller 122. In some instances, the user interface 152 may be centrally located at a convenient place within the building. In some cases, the user interface 152 may take an appearance similar to a traditional HVAC controller, but may not include an on-board temperature sensor or a controller that implements a thermostat control algorithm for generating control signals to directly operate HVAC equipment. In some cases, the user interface 152 may be a display panel that may be used to enter, edit and/or view parameters for HVAC, security, audio/visual and other systems in the building 10.

In the example shown, a user is able to communicate with the user interface module 152, and thus communicate with the HVAC controller 122, via the router 132 and cloud 134. The user may use the smartphone 136 to communicate with the cloud 134, and via the cloud 134 through the router 132 to the user interface module 152. The user interface module 152 may then communication with the HVAC controller 122. In some cases, the smartphone 136 may include an executable program that causes the smartphone 136 to provide a user interface that enables the user to increase or decrease a temperature setpoint, enter or edit parameters for a programmable schedule, enter or edit geofencing parameters, and the like. In some cases, the HVAC controller 122 may not include a user interface, or in some cases may only include a rudimentary user interface that permits simple edits only such as only changing the current temperature setpoint.

Figure 9:
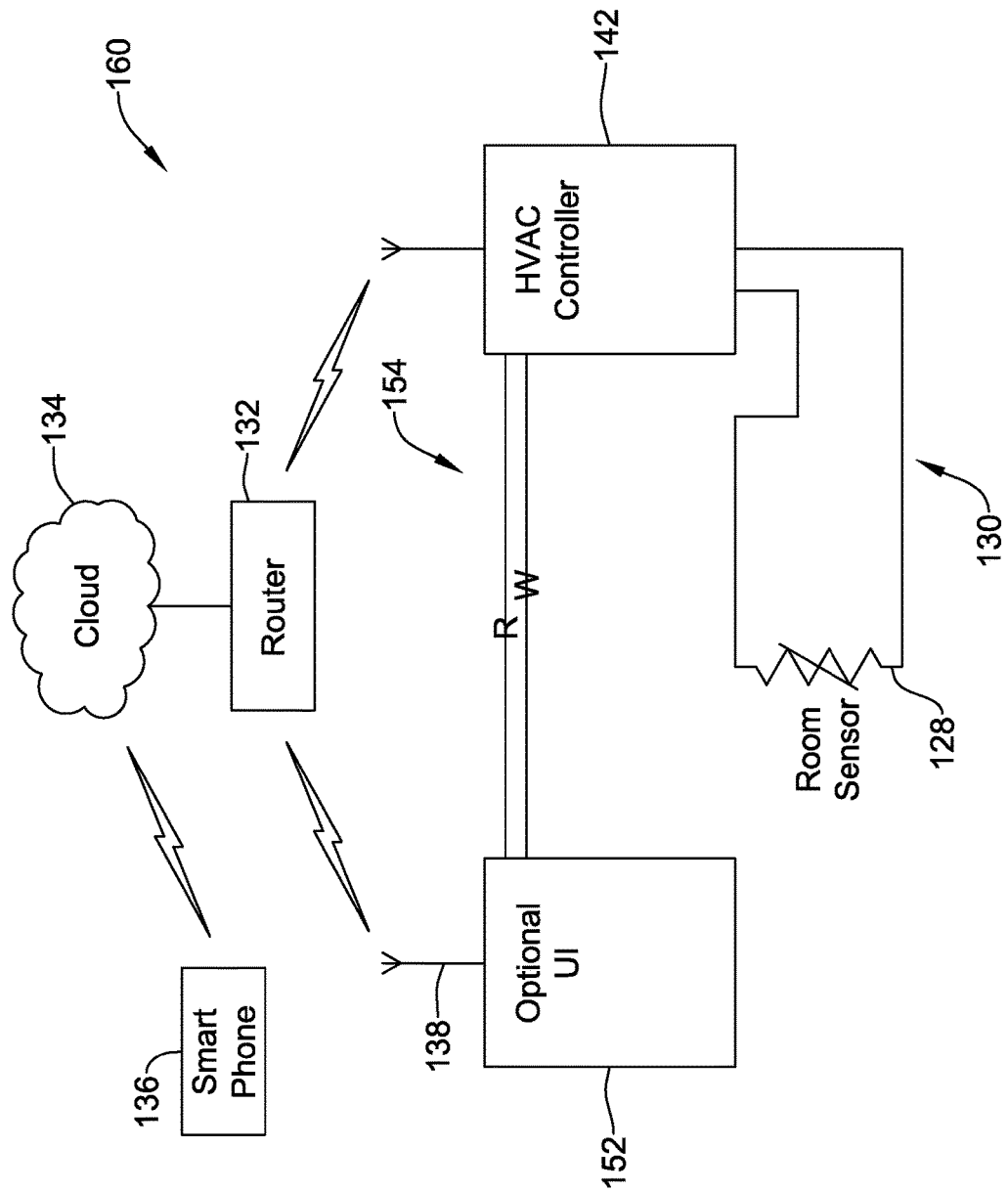
FIG. 9 is a schematic view of an illustrative HVAC control system.

FIG. 9 is a schematic block diagram of an HVAC control system 160 that may be considered as combining particular features of the HVAC control system 140 (FIG. 7) and the HVAC control system 150 (FIG. 8). The HVAC control system 160 combines the HVAC controller 142, including a wireless module that has a wireless antenna 138 for wireless communication, with an (optional) user interface module 152. A room temperature sensor 128 may be disposed elsewhere in the building in order to provide an indication of temperature within the living space, for example, and may be hard wired to the HVAC controller 142 via a wired connection 130.

A user is able to communicate with the HVAC controller 142, via the router 132 and cloud 134. The user may use the smartphone 136 to communicate with the cloud 134, and via the cloud 134 through the router 132 to the HVAC controller 142. In some cases, the smartphone 136 may include an executable program that causes the smartphone 136 to provide a user interface that enables the user to increase or decrease a temperature setpoint, enter or edit parameters for a programmable schedule, enter or edit geofencing parameters, and the like. In some cases, the HVAC controller 142 may not include a user interface, or in some cases may only include a rudimentary user interface that permits simple edits only such as only changing the current temperature setpoint. In some cases, if the optional user interface module 152 is present, the user may be able to use the user interface module 152 to increase or decrease a temperature setpoint, enter or edit parameters for a programmable schedule, enter or edit geofencing parameters, and the like. These changed parameters may be communicated from the optional user interface module 152 to the HVAC controller 142 via the router 132 as shown, or through a direct wireless communication path between the two devices. In some cases, the optional user interface module 152 may be battery powered, powered by line voltage, or powered from a transformer of the HVAC controller 142 via a wired connection 154.

Figure 10:
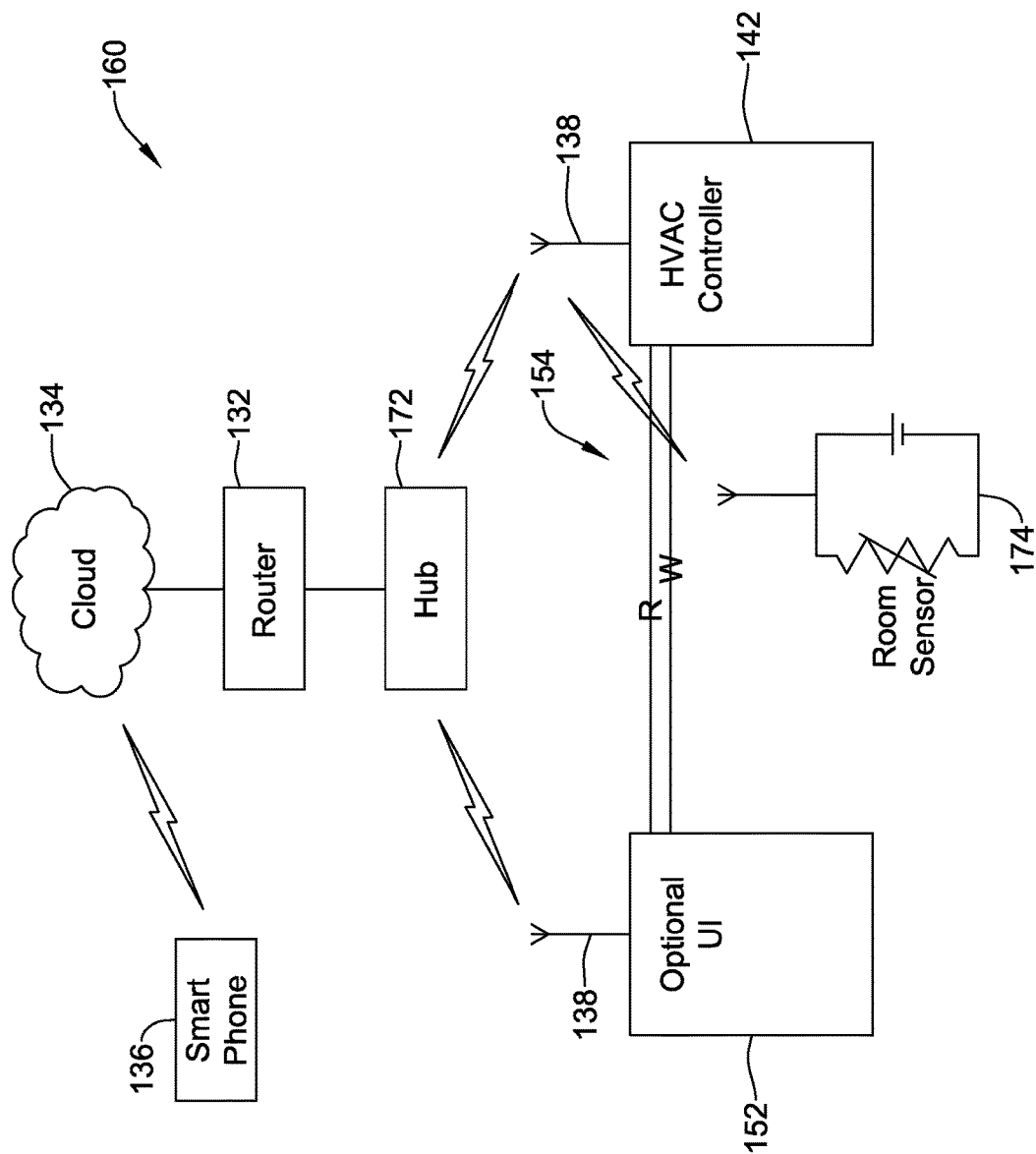
FIG. 10 is a schematic view of an illustrative HVAC control system.

FIG. 10 is a schematic block diagram of an HVAC control system 170 that may be considered as being similar to the HVAC control system 160 (FIG. 9), but with two additions. In FIG. 10, the HVAC controller 142 may be in wireless communication with a remote temperature sensor 174. This may provide advantages in sensor positioning relative to a wired temperature sensor, for example. The other addition to the HVAC control system 170 is a hub 172. The hub 172 may provide a wireless network by which the HVAC controller 122, the (optional) user interface module 152 and/or other components (e.g. remote temperature sensor 174) may communicate. In some cases, the hub 172 may be part of a smart house in which multiple systems and components are able to communicate. In some cases, the hub may support a 900 MHz network, a Wifi Network, or any other suitable network as desired.

A user is able to communicate with the HVAC controller 142, via the router 132 and cloud 134. The user may use the smartphone 136 to communicate with the cloud 134, and via the cloud 134 through the router 132 to the HVAC controller 142 and/or the user interface module 152 (if present). In some cases, the smartphone 136 may include an executable program that causes the smartphone 136 to provide a user interface that enables the user to increase or decrease a temperature setpoint, enter or edit parameters for a programmable schedule, enter or edit geofencing parameters, and the like. In some cases, the HVAC controller 142 may not include a user interface, or in some cases may only include a rudimentary user interface that permits simple edits only such as only changing the current temperature setpoint. In some cases, if the optional user interface module 152 is present, the user may be able to utilize the user interface module 152 to perform certain functions, such as increase or decrease a temperature setpoint, enter or edit parameters for a programmable schedule, enter or edit geofencing parameters, and the like.

Figure 11:
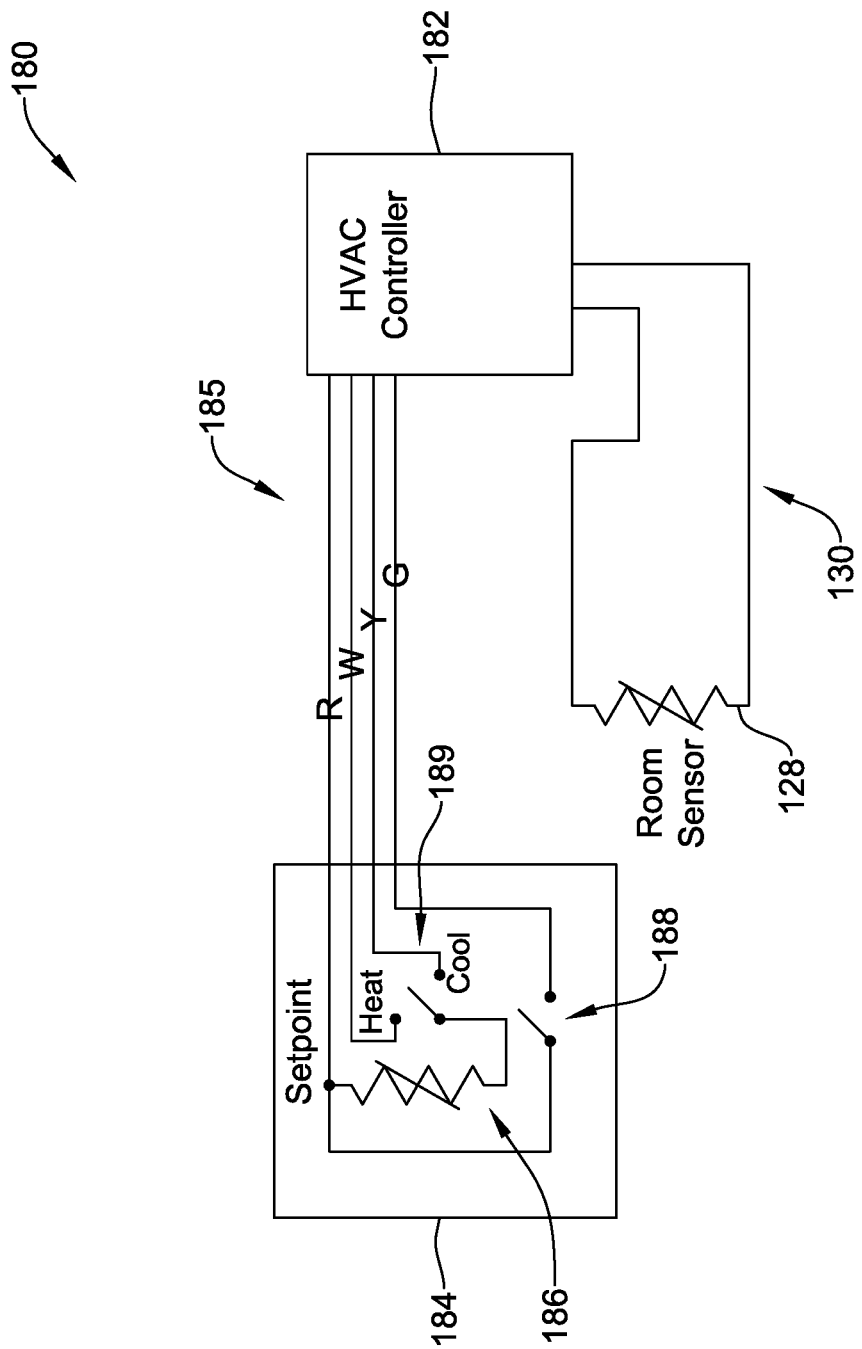
FIG. 11 is a schematic view of an illustrative HVAC control system.

FIG. 11 is a schematic block diagram of an HVAC control system 180 that may, for example, be used in controlling operation of the HVAC system 78 (FIGS. 2, 4 and 5). The HVAC control system 180 includes an HVAC controller 182 that is operably coupled to a simple user interface 184. The simple user interface 184 includes a wired connection 185 to the HVAC controller 182, which in this case includes a R line (Power), a W line (Heat), a Y line (Cool) and a G line (Fan). In some cases, the simple user interface 184 may be a mechanical interface that has a potentiometer for adjusting the resistance of resistor 186, a fan switch 188 and a mode switch 189. When the fan switch 188 is closed, power from the R line is directed to the G line (Fan). When the G line is asserted, the HVAC controller 182 may turn the fan on. When the mode switch is set to heat mode, a voltage and/or current that is dependent on the resistance of resistor 186 is provided down the W line (Heat). The resistance of the resistor 186 is dependent upon the position of the potentiometer, which is used by the user to set the set point. The HVAC controller 182 may translate the voltage and/or current on the W line (Heat) into a corresponding heat set point, and may then control the HVAC system using that heat set point. When the mode switch is set to cool mode, a voltage and/or current that is dependent on the resistance of resistor 186 is provided down the Y line (Cool). The resistance of the resistor 186 is dependent upon the position of the potentiometer, which is used by the user to set the set point. The HVAC controller 182 may translate the voltage and/or current on the Y line (Cool) into a corresponding cool set point, and may then control the HVAC system using that cool set point.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. An HVAC controller for an HVAC system that is configured to condition a living space within a building, the HVAC controller comprising:
one or more transceivers for wirelessly communicating with a network, the one or more transceivers configured to establish communication with a remote server via the network;
wiring terminals for receiving a wired connection to a remote temperature sensor that is situated remote from the HVAC controller and in the living space of the building; and
a controller operably coupled to the one or more transceivers and the wiring terminals, the controller is configured to:
receive a sensed temperature signal from the remote temperature sensor via the wiring terminals;
receive a temperature setpoint via the network;
implement a thermostat control algorithm to generate one or more control signals,
wherein the HVAC controller is configured to be located inside the housing of the HVAC system, and wherein the housing of the HVAC system includes one or more HVAC components, wherein the one or more HVAC components comprise one or more of a blower, a heat exchanger, a burner, or a gas valve;
wherein the HVAC system does not include a remote temperature sensor capable of changing the setpoint;
wherein the one or more control signals are provided to the HVAC system to control one or more HVAC components of the HVAC system; and
wherein the thermostat control algorithm is configured to compare the sensed temperature signal received from the remote temperature sensor to the temperature setpoint received via the network.

2. The HVAC controller of claim 1, wherein the HVAC controller is free from an on-board temperature sensor that is used by the thermostat control algorithm to generate the one or more control signals.

3. The HVAC controller of claim 1, wherein the HVAC controller is implemented at least in part by a control board of one of the one or more HVAC components of the HVAC system.

4. The HVAC controller of claim 3, wherein the one or more HVAC components of the HVAC system comprises a furnace, and the HVAC controller is implemented at least in part by a furnace control board of the furnace.

5. The HVAC controller of claim 4, wherein the housing is a furnace housing, and wherein the furnace control board is located inside of the furnace housing.

6. The HVAC controller of claim 1,
wherein one or more HVAC components of the HVAC system comprises a furnace,
wherein the housing is a furnace housing and the furnace comprises:
the burner is situated inside of the furnace housing;
the heat exchanger is situated inside of the furnace housing and thermally coupled to the burner;
the blower is situated inside of the furnace housing for providing air across the heat exchanger;
the gas valve is configured to provide gas to the burner; and
a furnace controller situated inside of the furnace housing for controlling the gas valve and the blower, wherein the HVAC controller is implemented at least in part by the furnace controller.

7. The HVAC controller of claim 1, wherein the HVAC controller is implemented at least in part by an Equipment Interface Module (EIM) that is wired to one or more HVAC components of the HVAC system.

8. The HVAC controller of claim 1, wherein the one or more transceivers comprises a WiFi transceiver for communicating with the network.

9. The HVAC controller of claim 1, wherein the HVAC controller is powered by a transformer of the HVAC system.

10. An HVAC controller for an HVAC system that is configured to condition a living space within a building, the HVAC controller comprising:
one or more transceivers for wirelessly communicating with a network, the one or more transceivers configured to communicate with a remote server via the network and configured to wirelessly communicate with a remote temperature sensor that is situated remote from the HVAC controller and in the living space of the building;
a controller operably coupled to the one or more transceivers, the controller is configured to:
receive a sensed temperature signal from the remote temperature sensor;

receive a temperature setpoint via the network;
implement a thermostat control algorithm to generate one or more control signals,
wherein:
the HVAC controller is located inside a housing of the HVAC system, wherein the housing of the HVAC system includes one or more HVAC components, wherein the one or more HVAC components comprise one or more of a blower, a heat exchanger, a burner, or a gas valve;
wherein the HVAC system does not include a remote temperature sensor capable of changing the setpoint;
the one or more control signals are provided by a wired connection to the HVAC system to control one or more HVAC components of the HVAC system; and
the thermostat control algorithm is configured to use the sensed temperature signal received from the remote temperature sensor via the one or more transceivers and the temperature setpoint received via the network.

11. The HVAC controller of claim 10, wherein the HVAC controller is free from an on-board temperature sensor that is used by the thermostat control algorithm to generate the one or more control signals.

12. The HVAC controller of claim 10, wherein the HVAC controller is implemented at least in part by a control board of one of the one or more HVAC components of the HVAC system.

13. The HVAC controller of claim 12, wherein the one or more HVAC components of the HVAC system comprises a furnace, and the HVAC controller is implemented at least in part by a furnace control board of the furnace.

14. The HVAC controller of claim 13, wherein the housing is a furnace housing, and wherein the furnace control board is located inside of the furnace housing.

15. The HVAC controller of claim 1, wherein the one or more transceivers comprises a first transceiver for communicating with the network using a first communication protocol and a second transceiver for communicating with the remote temperature sensor using a second communication protocol.

16. The HVAC controller of claim 15, wherein the second transceiver consumes less power than the first transceiver during wireless communication.

17. An HVAC controller for an HVAC system that is configured to condition a living space within a building,
the HVAC system comprising a housing that includes one or more HVAC components, wherein the one or more HVAC components comprise one or more of; a blower, a heat exchanger, a burner; or a gas valve; and
the HVAC controller comprising:
wiring terminals:
for receiving a wired connection to a wireless interface that is distinct from the HVAC controller, the wireless interface is configured to communicate with a remote server via a network; and
for receiving a wired connection to a remote temperature sensor that is situated remote from the HVAC controller and in the living space of the building;
a controller operably coupled to the wiring terminals, the controller is configured to:
receive a sensed temperature signal from the remote temperature sensor via the wiring terminals;
receive a temperature setpoint via the network;
implement a thermostat control algorithm to generate one or more control signals, wherein:
the HVAC controller is located inside the housing of the HVAC system,
wherein the HVAC system does not include a remote temperature sensor capable of changing the setpoint;
the one or more control signals are provided by a wired connection to the HVAC system to control one or more HVAC components of the HVAC system; and
the thermostat control algorithm is configured to use the sensed temperature received from the remote temperature sensor via the wiring terminals and the temperature setpoint received from the remote server via the wiring terminals by way of the wireless module.

18. The HVAC controller of claim 17, wherein the wired connection between the HVAC controller and the wireless module comprises at least two power lines and at least one data line.

19. The HVAC controller of claim 17, wherein the HVAC controller is configured to only access the network via the wiring terminals by way of the wireless module.

20. The HVAC controller of claim 17, wherein the HVAC controller further comprises one or more transceivers for wirelessly communicating with the network, and wherein the HVAC controller is configured to access the network via the one or more transceivers and via the wiring terminals by way of the wireless module.

* * * * *